(12) United States Patent
Aufderheide et al.

(10) Patent No.: US 6,555,235 B1
(45) Date of Patent: Apr. 29, 2003

(54) TOUCH SCREEN SYSTEM

(75) Inventors: Brian E. Aufderheide, Cedarburg, WI (US); Paul D. Frank, Oak Creek, WI (US)

(73) Assignee: 3M Innovative Properties Co., St. Paul, MN (US)

( * ) Notice: Subject to any disclaimer, the term of this patent is extended or adjusted under 35 U.S.C. 154(b) by 224 days.

(21) Appl. No.: 09/611,439

(22) Filed: Jul. 6, 2000

(51) Int. Cl.⁷ .................................................. B32B 9/00
(52) U.S. Cl. ........................ 428/447; 428/327; 428/429; 156/329
(58) Field of Search ............................. 428/447, 327, 428/429; 156/329

(56) References Cited

U.S. PATENT DOCUMENTS

| | | |
|---|---|---|
| 5,955,198 A | 9/1999 | Hashimoto et al. |
| 6,034,335 A | 3/2000 | Aufderheide et al. ........ 200/5 A |

FOREIGN PATENT DOCUMENTS

| | | |
|---|---|---|
| EP | 0 697 646 A1 | 2/1996 |
| EP | 0 867 493 A2 | 9/1998 |
| WO | WO 93/07844 | 4/1993 |

*Primary Examiner*—Robert Dawson
*Assistant Examiner*—Christopher Keehan
(74) *Attorney, Agent, or Firm*—Robert J. Pechman

(57) ABSTRACT

A pressure sensitive spacer coating for a touch screen may include a silicone adhesive material dissolved in a solvent. A touch screen may also include a first layer including a first conductive coating, a second layer including a second conductive coating, and a silicone pressure sensitive adhesive disposed between the first layer and the second layer. A method of manufacturing a touch screen may include providing a first layer having a first translucent conductive surface. The method may also include providing a second layer having a second translucent conductive surface. The method may also include applying an adhesive solution including silicone on at least one of the first conductive surface and the second conductive surface. The touch screen can be an analog or a matrix resistive touch screen. The adhesive can be applied by screen printing. The adhesive can be mixed with a slow evaporating solvent before screen printing.

19 Claims, 3 Drawing Sheets

TOUCH SCREEN SYSTEM

FIELD OF THE INVENTION

The present invention relates to touch sensors or touch screens. More particularly, the present invention relates to a spacer adhesive material for touch sensors or touch screens.

BACKGROUND

Generally, touch sensors or touch screens, such as, capacitive or resistive touch screens, are used in front of a computer driven display capable of variable images or in front of a non-variable display capable of providing fixed images. The touch sensor or touch screen provides an interface so that a human can provide commands to a computer or other control device. Touch screens can be used with computers, control panels, controllers, pocket organizers (e.g., PALM™ handheld computer commercially available from Palm, Inc. of Santa Clara, Calif.), arcade games, or any electronic device requiring human interaction. Generally, the touch screen is placed above (in front of) the display and includes at least one electrically conductive layer, which is used to sense the presence and location of a touch.

As an example of one type of touch screen, a conventional resistive touch screen includes two layers which are often referred to as a flex layer and a stable layer. Both the flex layer and the stable layer have transparent conductive coatings on opposing surfaces. A spacer material (or materials) separates the flex layer and the stable layer from each other. The spacer material ensures that an air gap or other relatively non-conductive medium separates the conductive coatings when the touch screen is not touched or depressed.

When the outer front surface of the touch screen is deformed or pressed, the two transparent conductive coatings are brought into electrical contact. More specifically, the flex layer is deformed and the conductive coating on the flex layer contacts the conductive coating on the stable layer. Typically, the stable layer is not flexible.

Conventional resistive touch screens include matrix touch screens and analog touch screens. Matrix touch screens generally have transparent conductive coatings patterned in rows on one surface (e.g., the flex layer) and in columns (orthogonal to the rows) on the opposing surface (e.g., the stable layer). When force is applied and electrical contact is made (as described above), a discrete switch is closed. The discrete switch is associated with a particular row and column. A computer or other electronic circuit can be used to provide electric signals from the rows and columns to determine the horizontal and vertical position (X, Y coordinate) associated with the discrete switch that is closed.

In analog resistive touch screens, the transparent conductive coatings are provided on the flex and stable layers and are often an indium tin oxide ("ITO") material. The conductive coatings have uniform sheet resistivity. The sheet resistivity used in analog resistive touch screens is typically between about 100 and 1000 Ohms/square, with about 200 to 400 Ohms/square being a more preferred resistivity.

A voltage is applied to one end of one of the transparent conductive (resistive) layers through a conductive bus bar, while the bus bar at the other end of the same layer is held at ground. This produces a linear voltage gradient across the screen. The bus bar is configured to create a horizontal voltage gradient on one screen (e.g., flex layer) and a vertical voltage gradient on the other screen (e.g., stable layer). When a force, such as, by an input device (e.g., finger, stylus, etc.) is applied to the flex layer, the flex layer electrically contacts the stable layer and the switch is closed. With the switch closed, one floating layer (e.g., flex layer) is used to receive the voltage created by the gradient on the other layer (e.g., stable layer) at the point of contact. The role of each layer is then reversed and the voltage is measured on the other layer. The analog resistive touch screen may be connected to a computer or electronic circuit that decodes the voltages and converts them to a position associated with the touch. Two voltage readings are used to assign a horizontal and vertical position or point (X, Y coordinate) for the location of the touch. Points can be recorded electronically so rapidly that signatures can be digitized and recorded.

Conventional touch screens generally utilize a spacer material including an acrylic pressure sensitive adhesive ("PSA") to hold the flex layer and the stable layer together and to space apart the flex layer and the stable layer. The spacer material is typically 0.001 to 0.010 inch thick adhesive. The spacer adhesive is typically cut from pre-coated rolls or sheets of adhesive with a release liner on both sides. The spacer material is typically adhered to only the perimeter of the flex layer or the stable layer; the center of the spacer material is left open so that the flex layer can make contact to the stable layer when pressure is applied.

Typically, acrylic PSA is used as the spacer material. The acrylic PSA may or may not be provided with a thin plastic support, such as, a 0.001 inch polyester layer. The sheets are typically stack cut to the appropriate size and die cut with a steel rule die. Most resistive touch screens are rectangular shaped, and therefore the desired spacer adhesive is a rectangular ring.

Generally, substantially more material is discarded than is actually used during fabrication or manufacture of the touch screen. The waste associated with these cutting operations is typically removed by hand and discarded. Accordingly, waste associated with the conventional spacer material is large. In addition, the manual processes associated with the removal of waste adds to the expense of manufacturing the touch screen. Further, the cutting and removal operations associated with conventional spacer materials creates debris that can adversely affect the optical quality associated with the touch screen.

Most acrylic PSA used in conventional spacer materials can have a substantial adverse effect on the resistivity of the conductive coatings (e.g., ITO), especially in high temperature and high humidity environments. Thus, conventional acrylic PSAs are not compatible with the conductive coatings used in touch screens.

Silicone-based PSA sheets are also available. However, such silicone-based PSA sheets are disadvantageous in touch screen applications because they can cost approximately seven times the cost of acrylic PSA sheets.

Screen printed, ultra-violet light cured acrylate adhesives have rarely been used with touch screens due to inadequate performance. UV cured acrylate adhesives are made from a mixture of various acrylate monomers and oligomers to produce a relatively low glass transition temperature (Tg) coating, which is UV cured to a pressure sensitive solid. The cured adhesive can be covered with a silicone release liner. The UV cured acrylate adhesives are susceptible to foaming during printing, show adhesive creep into the electrically active area, are difficult to reproduce, and adversely affect the conductivity of ITO. In addition, these adhesives have poor holding characteristics at elevated temperatures (e.g., the flex layer "de-bonds", comes apart or separates from the stable layer at high temperatures).

Acrylic PSAs have been applied by screen printing in certain less demanding applications than touch screen applications. However, the polymers used with solvent-based acrylic PSAs make screen printing difficult. For example, acrylic PSAs are susceptible to foaming and stringy rheology. In addition, acrylic PSAs tend to have too low of a solids content, which may not sufficiently achieve the desired final dry thickness. Further still, acrylic PSAs are only typically available in relatively fast evaporating solvents, which tend to "plug" the print screen.

Thus, there is a need for an adhesive material that is compatible with conductive coatings. Further, there is a need for a method of applying a spacer material for a touch screen that does not create significant debris. Further still, there is a need for a low cost adhesive material that can be easily applied in a touch screen application. Even further still, there is a need for a touch screen that is relatively easy to assemble and includes a spacer material that does not react substantially with conductive coatings associated with the flex and stable layers. Further still, there is a need for a printed adhesive with the mechanical integrity to hold touch screens together in adverse environments where other printed adhesives fail.

SUMMARY

An exemplary embodiment relates to a pressure sensitive spacer coating for a touch screen. The pressure sensitive spacer coating includes a silicone adhesive material dissolved in a solvent. The silicone adhesive material can include at least one of polydimethyl siloxane, polydiphenyl siloxane and polydimethyldiphenyl siloxane.

Another exemplary embodiment relates to an adhesive mixture. The adhesive mixture is configured for applying to a surface of a touch screen as a spacer adhesive. The mixture includes a silicone pressure sensitive adhesive and a relatively slow evaporating solvent. The solvent can include at least one of toluene and xylene.

Another exemplary embodiment relates to a touch screen. The touch screen includes a first layer and second layer. The first layer includes a first conductive coating, and the second layer includes a second conductive coating. A silicone pressure sensitive adhesive is disposed between the first layer and the second layer.

Yet another exemplary embodiment relates to a method of manufacturing a touch screen. The method includes providing a first layer having a first translucent conductive surface, providing a second layer having a second translucent conductive surface, and applying an adhesive solution including silicone on at least one of the first conductive surface and the second conductive surface.

BRIEF DESCRIPTION OF THE DRAWINGS

Exemplary embodiments will be described hereinafter with reference to the accompanying drawings wherein like numerals denote like elements.

DETAILED DESCRIPTION OF PREFERRED AND OTHER EXEMPLARY EMBODIMENTS

Figure 1:
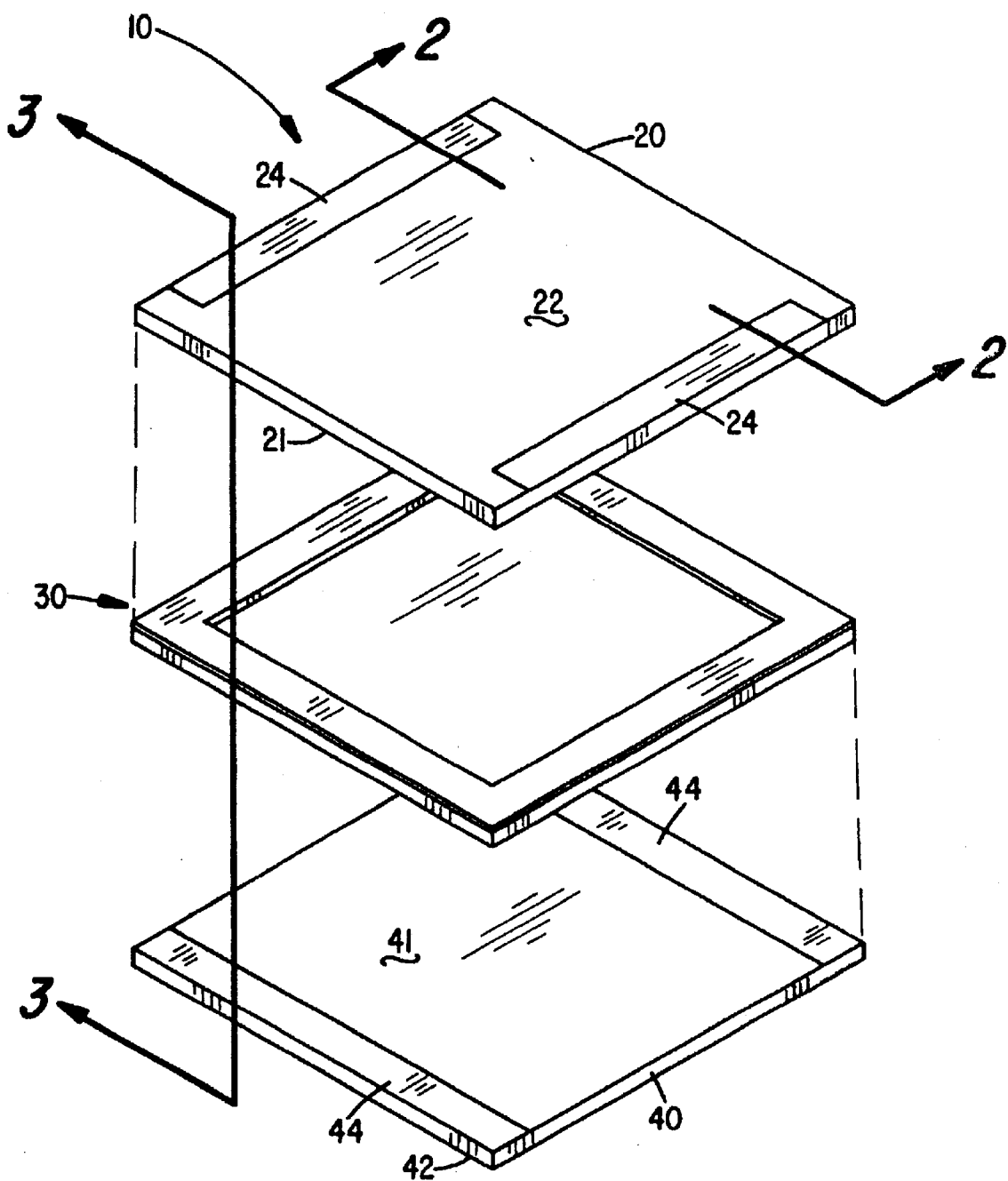
FIG. 1 is an exploded isometric view of a touch screen.

A touch screen 10 is shown in FIG. 1. A particularly suitable touch screen includes the DYNACLEAR® 4-wire analog resistive touch panel computer commercially available from Dynapro Thin Film Products, Inc. of Milwaukee, Wis. Alternatively, screen 10 can be a matrix touch screen, or other type of apparatus for sensing "touches" or input by physical contact at a user interface. Screen 10 has a "sandwiched" or layered construction including a flexible or deformable layer (shown as a flex layer 20), an adhesive layer or spacer 30, and a stable layer 40, which may be flexible.

Figure 2:
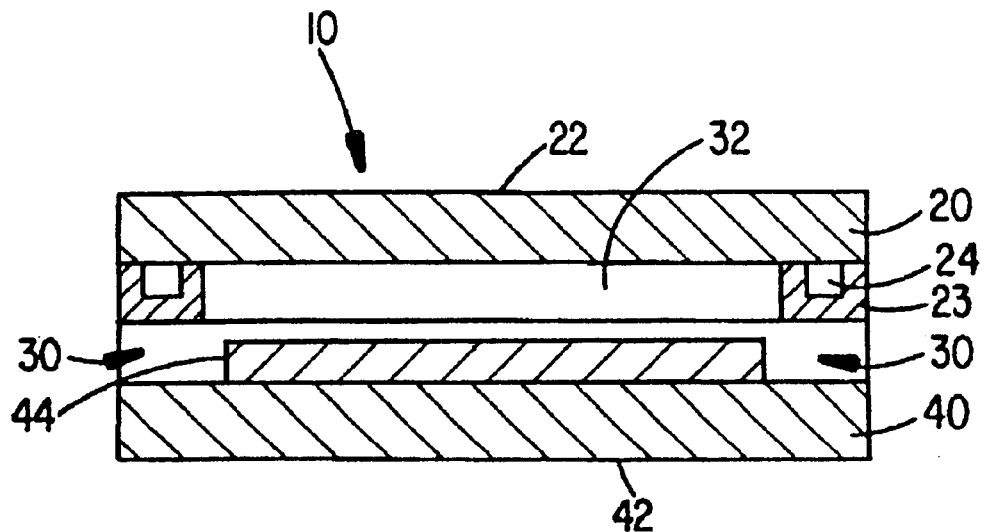
FIG. 2 is a cross-sectional view of the touch screen shown in FIG. 1 along line 2—2.
Figure 3:
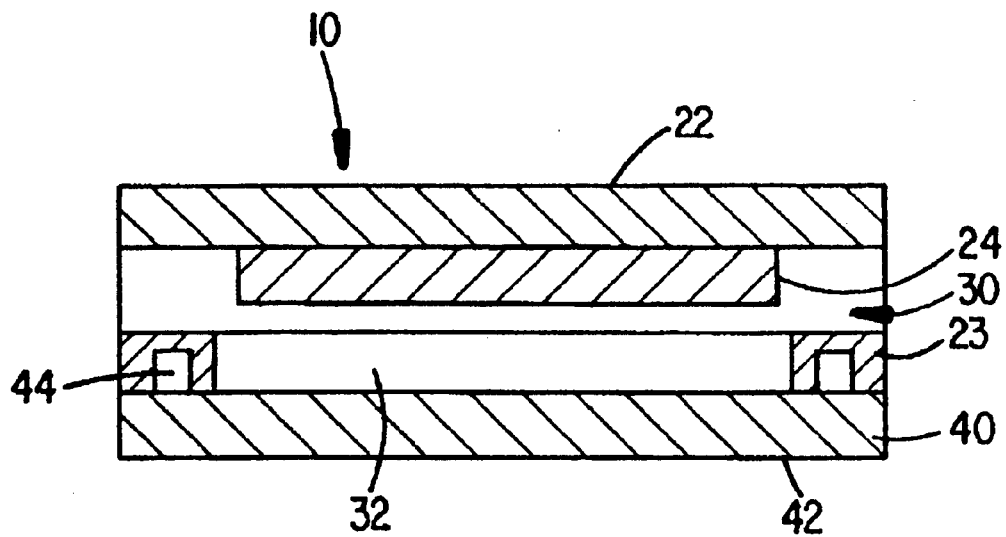
FIG. 3 is a cross-sectional view of the touch screen shown in FIG. 1 along line 3—3.

Flex layer 20 and stable layer 40 are preferably opposing substrates separated by an air gap 32 (see FIG. 3). A conductive coating is applied to an interior surface 21 of flex layer 20 and an interior surface 41 of stable layer 40. Gap 32 allows contact between the conductive coatings on surfaces 21 and 41, and assists in insulating the materials on surfaces 21 and 41 from each other. Layers 20 and 40 can include a two or three layer anti-reflective coating (see FIG. 4) on interior surfaces 21 and 41, respectively. (According to an alternative embodiment, the flex layer and the stable layer do not include an anti-reflective coating, or can include a single layer or a double layer anti-reflective coating.) Layer 20 includes an exterior surface 22, and layer 40 includes an exterior surface 42. Layer 20 includes a set of conductive bus bars 24, and layer 40 includes a set of conductive bus bars 44. Optionally, as shown in FIG. 2, an insulating layer 23 can be applied over the conductive bus bars on either layer 20 or 40 to assure that coatings on surfaces 21 and 41 are electrically separated when the screen is not being touched. Insulator 23 may be a UV cured acrylate, thermally cured epoxies or other similar material that is both electrically insulating, compatible with ITO and adheres to ITO and conductive inks.

Screen 10 "senses" or recognizes the existence and location of a "touch" on surface 22. Exterior surface 22 is closer to the touch than interior surface 21. Spacer 30 is insulative and provides gap 32 between layer 20 and layer 40. During an input event or "touch", layer 20 is deformed or bent across gap 32 to contact layer 40. When layer 20 contacts layer 40, the touch from an input device (e.g., finger or stylus) can be "sensed". Generally, the touch is sensed when conductive materials on surface 21 contacts conductive materials on surface 41.

Spacer 30 is preferably a silicone or silicone-based pressure sensitive adhesive ("PSA"), PSA laminate or coating (e.g., model number 7502 adhesive commercially available from Dow Corning Corporation of Midland, Mich., or UCT PS221 commercially available from United Chemical Technologies, Inc. of Bristol, Pa.). The silicone-based PSA material can be advantageously applied to layer 20 and/or layer 40 by screen printing techniques utilizing a wiper (e.g., a squeegee) and a woven or non-woven material (e.g., stainless steel mesh, polyester mesh, nylon mesh, metal (stainless steel), plastic utensil, etc.) or other device for selectively applying the silicone-based PSA material. Preferably, spacer 30 is applied about the periphery of layers 20 and 40. Preferably, the spacer is provided on one or both of surfaces 21 and 41.

The silicone-based PSA material generally includes a gum and a resin. The gum is typically a soft, linear siloxane polymer with a —Si($R_2$)O— (R=methyl or phenyl) backbone. The resin is typically a hard, highly branched/crosslinked product made from a hydrolyzed tri or quadra functional silane ($CH_3SiCl_3$ or $SiCl_4$) core, end capped with monofunctional silanes, such as $(CH_3)_3SiCl$. A suitable resin includes, for example, GE SR1000 MQ Resin (polytrimethylhydrosilylsilicate) commercially available from General Electric Company of Fairfield, Conn.

The siloxane gum and resin material is preferably dissolved in a solvent (e.g., an organic aromatic solvent such as toluene or xylene, COMSOLVE 150™ solvent commercially available from commerce Industrial Chemical, Inc. of Milwaukee, Wis., a glycol ether such as butyl CELLOSOLVE® acetate or butyl CARBITOL® acetate solvent commercially available from Union Carbide Corporation of Danbury, Conn.) to form an adhesive solution. A sufficiently slow evaporating solvent may reduce "plugging" or "drying" in the screen, so that many images can be printed without solvent drying and without substantially adversely affecting the printing operation. According to a preferred embodiment, the solvent is a relatively high boiling or a relatively slow evaporating solvent (e.g., may evaporate slower than any toluene or xylene that may be present in the PSA, evaporates about ten or more times slower than toluene or xylene).

The siloxane gum and resin material (and solvent) can be further cured by a catalyst including a peroxide (e.g., benzoyl peroxide, 2,4-dichlorobenzoyl peroxide, PERKADOX® organic peroxide commercially available from Akzo Chemie Nederland B.V. of Amersfoort, Netherlands, etc.) to increase the cohesive strength and temperature resistance of the dried adhesive.

Preferably, the silicone-based PSA material is dissolved in organic solvent and has characteristics that allow it to be screen printed without generating foam or significant bubbling in the adhesive. A relatively high solids content in the un-dried adhesive allows for a greater dried printed thickness. The thickness is beneficial for preventing surface 21 from contacting surface 41 when screen 10 is not being touched. Preferably, the silicone-based PSA material is more stable than conventional acrylic PSAs used in conventional touch screens. In one embodiment, the silicone adhesive material is stable at temperatures of as high as about 500° F. According to another embodiment, the silicone-based PSA material is essentially free of acid or base residues and oxidation agents from a polymerization catalyst (e.g., potassium or ammonium persulfate, sodium metabisulfite, ferrous ions, nickel based catalysts, butyl lithium, metal alcoholates, etc.), acidic functionality (such as acrylic acid), ionic components such as chloride anions or surfactants, or other materials that may react with ITO. Accordingly, the silicone-based PSA material is less reactive with, and has less of a tendency to adversely affect, the conductive coatings (e.g., transparent conductive oxide, ITO, tin oxide, tin antimony oxide, zinc oxide, etc.) on surfaces 21 and 41. The silicone-based PSA rheology is preferably not "stringy" and is not susceptible to large amounts of foam generation during printing (i.e., separates easily from the screen at the end of the print stroke).

Bus bars 24 and 44 can be silver ink typically having a conductivity about 1000 times more conductive than the translucent coatings on surfaces 21 and 41. Generally, surfaces 21 and 41 include an indium tin oxide (ITO) film having a resistivity of about 100–1000 Ohms/square. Alternatively, surfaces 21 and 41 can include a tin antimony oxide coating, a zinc oxide coating, or other appropriate conductive sheet. Preferably, translucent coatings on surfaces 21 and 41 have a resistivity of about 200–400 Ohms/square. The film is typically deposited by a "sputtering" technique (e.g., coated in a vacuum deposition process such as DC magnetron sputtering) or may be applied by any other method (e.g., evaporation, chemical vapor deposition, etc.) known to one of skill who reviews this disclosure.

Layers 20 and 40 are typically a thin translucent substrate. As used in this disclosure, the term "translucent" means allowing at least some or all light to pass. A translucent material includes all materials that are transparent and/or non-opaque. Preferably, layers 20 and 40 are manufactured from a polyester film (e.g., polyethylene terephthalate or PET) which is about 0.005 to 0.007 inches thick. Layers 20 and 40 can include anti-reflective coatings including the thin ITO film on surfaces 21 and 41, respectively. The ITO is typically deposited in a pattern such that the PET on the periphery of surfaces 21 and 41 is substantially exposed. Accordingly, spacer 30 may be in direct contact with a portion of surfaces 21 and 31, as well as any ITO coating or layer (see e.g., FIG. 4) and bus bars 24 and 44.

The translucent substrate may include a glass (e.g., soda lime glass that may be chemically strengthened), polyester, polycarbonate, etc. Layers 20 and 40 may also be provided with a decorative surface treatment (e.g., decorative covering, coating, paint, thin film, surface indicia, graphics display, colors, patterns, etc.) in a wide variety of combinations (i.e., with one area differing in whole or in part from another area of the layer). Layers 20 and 40 may also be suited or adapted to provide a wide variety of functional surface treatments (e.g., communicating information, a printed graphic, optical filter, electromagnetic shield, electrostatic shield, EMI shield, EMD shield, etc.) according to alternative embodiments.

Viewable images are provided through screen 10. Sources for such images can be, cathode ray tubes (CRTs), liquid crystal displays (LCDs), plasma displays, EL displays, books, pictures and/or other sources of information. Screen 10 can include an inlay that provides visual indicia, or can include a screen capable of providing variable visual indicia. Thus, images can be seen through layers 20 and 40 associated with screen 10.

Figure 4:
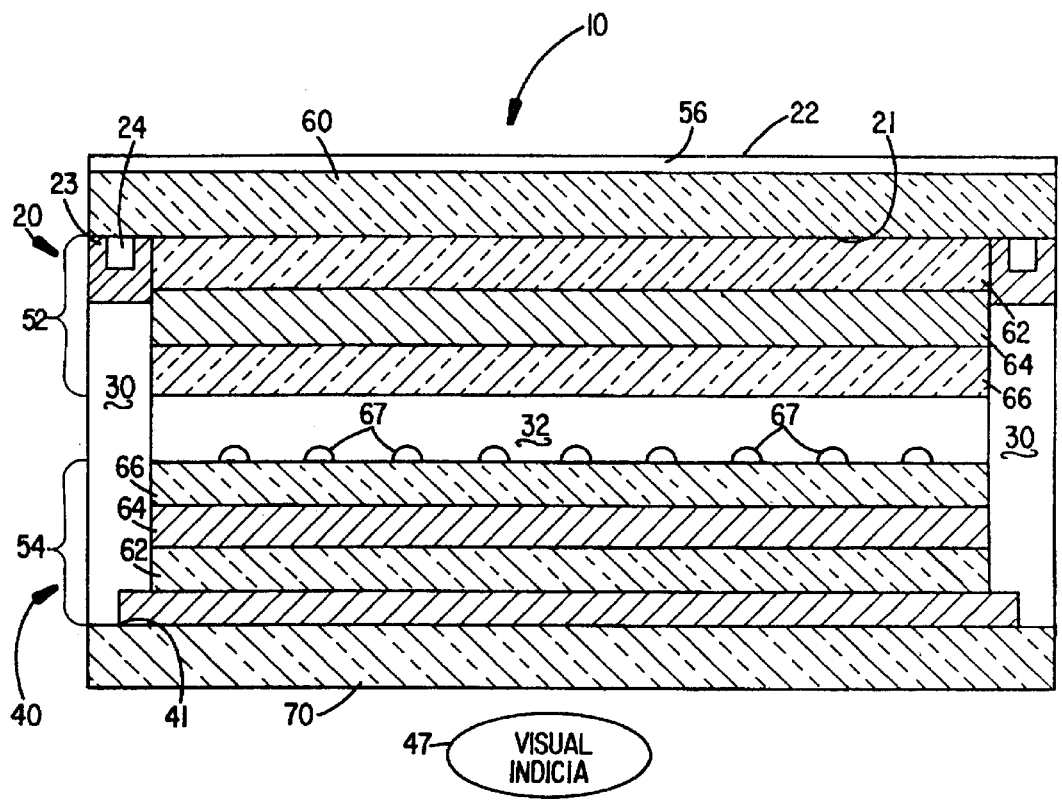
FIG. 4 is a cross-sectional view along line 3—3 of FIG. 1 of the touch screen illustrated in FIG. 1, showing conductive layers.

With reference to FIG. 4, screen 10 includes a triple layer anti-reflective coating 52 associated with surface 21 of layer 20, and a triple layer anti-reflective coating 54 associated with surface 41 of layer 40. Alternatively, screen 10 can have a single, double or triple layer coating either only on layer 20 or layer 40. Layers 20 and 40 may be a composite of transparent layers through which light is transmitted. For example, light from visual indicia 47 can be provided through layers 20 and 40.

Layer 20 includes a relatively hard coating layer 56, a layer or substrate 60 and anti-reflective coating 52. Similarly, layer 40 includes a layer or substrate 70 and anti-reflective coating 54. Substrates 60 and 70 are a translucent material, such as, glass, plastic, polycarbonate, PET, etc.

Layer 56 is associated with surface 22 of layer 20. Preferably, layer 56 is an ultra-violet light cured acrylate that provides a hard coating and is about 0.0001 to 0.0015 inches thick. Layer 56 can have a roughened surface to decrease reflective glare off surface 22 and to reduce the visibility of debris (e.g., fingerprints) on surface 22. A filler material, such as, silica particles or etching can produce the roughened surface of layer 56.

Surface 21 generally does not necessarily include a hard coating layer such as layer 56. Surface 21 can include a textured coating, such as, acrylic or other clear polymer coating filled with glass or plastic spheres (e.g., anti-Newton Ring coating) to prevent Newton rings (i.e., Newton Rings may result when light rays reflecting off of coatings 52 and 54 optically interfere in a final touch screen construction).

Layer 20 is built on substrate 60, which may be made of PET. Anti-reflective coating 52 includes a layer 62, a layer 64 and a layer 66. Layer 62 can be provided directly on substrate 60 or on the Newton Ring coating upon substrate 60. Layer 62 can be a relatively high index translucent material, such as, ITO, tin antimony oxide, tin oxide or yttrium oxide provided on surface 21. Layer 62 can be a conductive or non-conductive layer.

Layer 64 is a layer of silicon dioxide. Layer 66 is a layer of ITO and serves as the layer that provides the electrical contact between layers 20 and 40 when a touch is sensed.

Similar to anti-reflective coating 52, anti-reflective coating 54 is disposed on substrate 70, which may be made of PET glass or other translucent material. Anti-reflective coating 54 is comprised of layer 62, layer 64 and layer 66. Layers 62, 64 and 66 of anti-reflective coating 54 are similar to layers 62, 64 and 66 of anti-reflective coating 52. An insulating material (shown as spacer dots 67 made, for example, of UV cured acrylate, ink material, etc.) may be applied on layer 66 to assist in inhibiting layer 20 from contacting or touching layer 40 when screen 10 is not touched or pressed.

As discussed above with reference to FIGS. 1 through 3, spacer 30 is provided between conductive layers 66. The silicone-based PSA material for spacer 30 has preferably had all or most of the solvent removed when screen 10 is fully assembled, and has a thickness of approximately 1 mil. An adhesive is preferably provided on one or more of layers 66 in a screen printing operation. The adhesive material for spacer 30 is provided about the periphery of one or more of layers 66. Additionally, insulating spacer dot patterns can be used within the periphery of the touch screen on one or both of layers 66 for providing separation so that gap 32 exists between layers 66. U.V. cured acrylate materials are typically used as spacer dots and applied by screen printing.

The touch screen may be fabricated by printing and/or coating the patterned ITO on a roll (e.g., for the stable layer and the flex layer) and printing the conductive bus bars on the roll. The roll may then be cut into separate sheets. The insulator and spacer dots may be printed on the sheets, and the spacer adhesive may be printed on the sheets. A squeegee or wiper presses the adhesive through a mesh (e.g., stainless steel fabric, nylon screen, polyester screen, metal or plastic stencil, etc.) that has a pattern about the periphery of layers 66. The pattern is preferably woven so that small spaces exist where the adhesive is applied to layers 66. The screen is flooded and passed with the squeegee or flood bar to selectively coat the adhesive material associated with spacer 30 on layers 66. The adhesive material associated with spacer 30 is advantageously compatible with the materials associated with layers 66 (ITO) and is stable at the elevated temperature and elevated humidity requirements associated with touch screens. The use of the screen printing process also advantageously reduces waste and residue resulting from conventional die cutting spacer adhesive materials. (Any residual PSA may be recycled or reclaimed for subsequent use.) After the adhesive associated with spacer 30 is applied to at least one of layer 66, a fluorosilicone release liner (e.g. FURON® 0.002" PET/9022 fluorosilicone liner commercially available from Furon Corporation of Worcester, Mass.) can be provided over the adhesive to protect it from dirt and debris and for later attachment.

The sheets may be die cut into individual pieces. The individual pieces may be built on a building structure, such as mounting or alignment pins, along with any attachments necessary for registration of the layers during assembly. The layers are temporary aligned or "registered" together on the mounting structure. The release liner may then be removed, and the layers may be pressed together to assemble the final product. Any registration aid or mounting structure may be subsequently removed.

Spacers 30 can include silicone-based PSA material that may be made according to any of the following EXAMPLES or similar recipes, each which include an adhesive and a solvent, and which optionally include a resin and/or a peroxide:

EXAMPLE 1

| | |
|---|---|
| Dow Corning 7502 Adhesive | 100 gm. |
| Butyl CELLOSOLVE ® Acetate | 50 gm. |
| GE SR1000 MQ Resin (polytrimethylhydrosilylsilicate) | 7.5 gm. |
| Akzo Nobel Chemicals PERKADOX ® 50S-ps-a, 2,4-dichlorobenzoly peroxide | 0.75 gm. |

EXAMPLE 2

| | |
|---|---|
| Dow Corning 7502 Adhesive | 100 gm. |
| COMSOLVE 150 ™ | 50 gm. |
| GE SR1000 MQ Resin (polytrimethylhydrosilylsilicate) | 7.5 gm. |
| Akzo Nobel Chemicals PERKADOX ® 50S-ps-a, 2,4-dichlorobenzoly peroxide | 0.75 gm. |

EXAMPLE 3

| | |
|---|---|
| Dow Corning 7502 Adhesive | 100 gm. |
| Butyl CELLOSOLVE ® Acetate | 50 gm. |
| GE SR1000 MQ Resin (polytrimethylhydrosilylsilicate) | 7.5 gm. |

EXAMPLE 4

| | |
|---|---|
| Dow Corning 7502 Adhesive | 100 gm. |
| Butyl CELLOSOLVE ® Acetate | 50 gm. |
| Akzo Nobel Chemicals PERKADOX ® 50S-ps-a, 2,4-dichlorobenzoly peroxide | 0.75 gm. |

EXAMPLE 5

| | |
|---|---|
| UCT PS221 | 100 gm. |
| COMSOLVE 150 ™ | 50 gm. |
| Akzo Nobel Chemicals PERKADOX ® 50S-ps-a, 2,4-dichlorobenzoly peroxide | 0.50 gm. |

Preferably, each of the EXAMPLES 1 through 5 are formulated as follows. The adhesive (e.g., Dow Corning 7502 adhesive, UCT PS221, etc.) is placed in a container. The solvent (e.g., COMSOLVE 150™ solvent, butyl CELLOSOLVE® acetate solvent, etc.) is added and mixed with an air driven propeller mixer until homogenous. A resin (e.g., GE SR1000 resin) may be added. The mixture is mixed until completely dissolved. Before or during screen printing use, peroxide (e.g., PERKADOX® organic peroxide) can be added and mixed until completely dissolved.

The material of EXAMPLES 1 through 5 can be applied on an 80 mesh stainless steel screen on a sheet fed screen press. The adhesive is dried at about 90° C. for about three minutes followed by drying at about 125–135° C. for about three minutes in a forced air tunnel oven. The adhesive is preferably about one mil. thick when dry.

The adhesive material may be screen printed on layer 40 and assembled directly to opposing layer 20. Alternatively, the adhesive material may be covered with a fluorosilicone release liner (e.g. FURON® 9022 commercially available from Furon Corporation of Worcester, Mass.) for later use. Alternatively, the adhesive may be coated on layer 20 alone or both layer 20 and layer 40.

Various patterns including a rectangle with a hole in it, circular, dotted, matrices, etc. can be applied to the surface. By screen printing, the adhesive is applied only where needed. Die cut material waste may be substantially eliminated and adhesive costs may be reduced compared to sheets of silicone PSA.

The silicone-based PSA material is roughly at least about 50% to 70% solid by weight and about 30% to 50% solvent by weight. The adhesive material advantageously is able to have hundreds of printing passes before the screen may become "plugged," clogged, dried or no longer operational due to evaporation of the solvent. Adhesive layer or spacer 30 is compatible with ITO in layers 66.

The changes in resistance of a touch screen after one month are shown in TABLE I below. The conventional low acid, low ionic content acrylic adhesive material shows a 18.42% and 24.34% change at the first two test conditions, respectively. The change is significantly greater (and unexpectedly) than the changes associated with the silicone-based PSA materials disclosed in TABLE I. Accordingly, the silicone-based PSA is believed to be more compatible (e.g., more than about ten times) with layers 66 in the environments associated with touch screens.

TABLE I

Average % Change of ITO on PET Resistance after 1 Month

| Adhesive | At 60° C./ 95% Humidity | At 85° C., Ambient Humidity |
| --- | --- | --- |
| Dow Corning 702 Silicone | 1.73 | 5.75 |
| Dow Corning 7502 Silicone + Peroxide Cure | 2.49 | 7.04 |
| UCT PS221 Silicone | 1.94 | 7.78 |
| UCT PS221 Silicone + Peroxide Cure | 3.24 | 9.41 |
| Adhesives Research ARclean 8769 Acrylic | 18.42 | 24.34 |

It is understood that while preferred exemplary embodiments of the present invention are given, they are for purpose of illustration only. The construction and arrangement of the elements of the apparatus and method of the invention are not limited to the precise details, geometry, dimensions, materials and conditions disclosed. Those skilled in the art who review this disclosure will readily appreciate that many modifications are possible in the exemplary embodiments (such as variations in sizes, structures, shapes and proportions of the various elements, values of parameters, mounting arrangements, use and selection of materials, orientations, combinations of shapes, etc.) and are intended to be included within the spirit of the invention which is defined by the following claims.

What is claimed is:

1. A touch screen, comprising:

a first layer including a first conductive coating;

a second layer including a second conductive coating; and a printed silicone based pressure sensitive adhesive disposed between the first layer and the second layer.

2. The touch screen of claim 1 wherein the pressure sensitive adhesive is screen printed.

3. The touch screen of claim 2 wherein the pressure sensitive adhesive includes a high solids, solvent-based silicone adhesive.

4. The touch screen of claim 3 wherein the pressure sensitive adhesive is mixed with a relatively slow evaporating solvent.

5. The touch screen of claim 1 wherein the first and second conductive coatings include indium tin oxide.

6. The touch screen of claim 5 wherein the pressure sensitive adhesive includes a solvent, a peroxide catalyst, a silicone gum and resin.

7. A method of manufacturing a touch screen, the method comprising:

providing a first layer having a first translucent conductive surface;

providing a second layer having a second translucent conductive surface; and printing an adhesive comprising silicone on at least one of the first conductive surface and the second conductive surface.

8. The method of claim 7 wherein printing the adhesive further comprises screen printing the adhesive.

9. The method of claim 8 further comprising mixing the adhesive with a relatively slow evaporating solvent before screen printing.

10. The method of claim 8 wherein the adhesive is applied with a wiper through a screen.

11. The method of claim 7 wherein the first and second surface include indium tin oxide.

12. The touch screen of claim 2 wherein the first layer and the second layer are configured for receiving a touch input.

13. The touch screen of claim 12 wherein the adhesive is printed on the periphery of at least one of the first layer and the second layer.

14. The touch screen of claim 13 wherein the adhesive includes at least one of polydimethyl siloxane, polydiphenyl siloxane, and polydimethyldiphenyl siloxane.

15. The method of claim 9 wherein the conductive surface comprises a conductive coating.

16. The method of claim 15 further comprising applying a liner to the adhesive.

17. The method of claim 15 wherein the solvent has relatively high boiling point.

18. The method of claim 17 wherein the solvent has a boiling point greater than the boiling point of toluene.

19. The method of claim 18 wherein the solvent has a boiling point greater than about 232 degrees Fahrenheit.

\* \* \* \* \*